United States Patent Office 3,325,170
Patented June 13, 1967

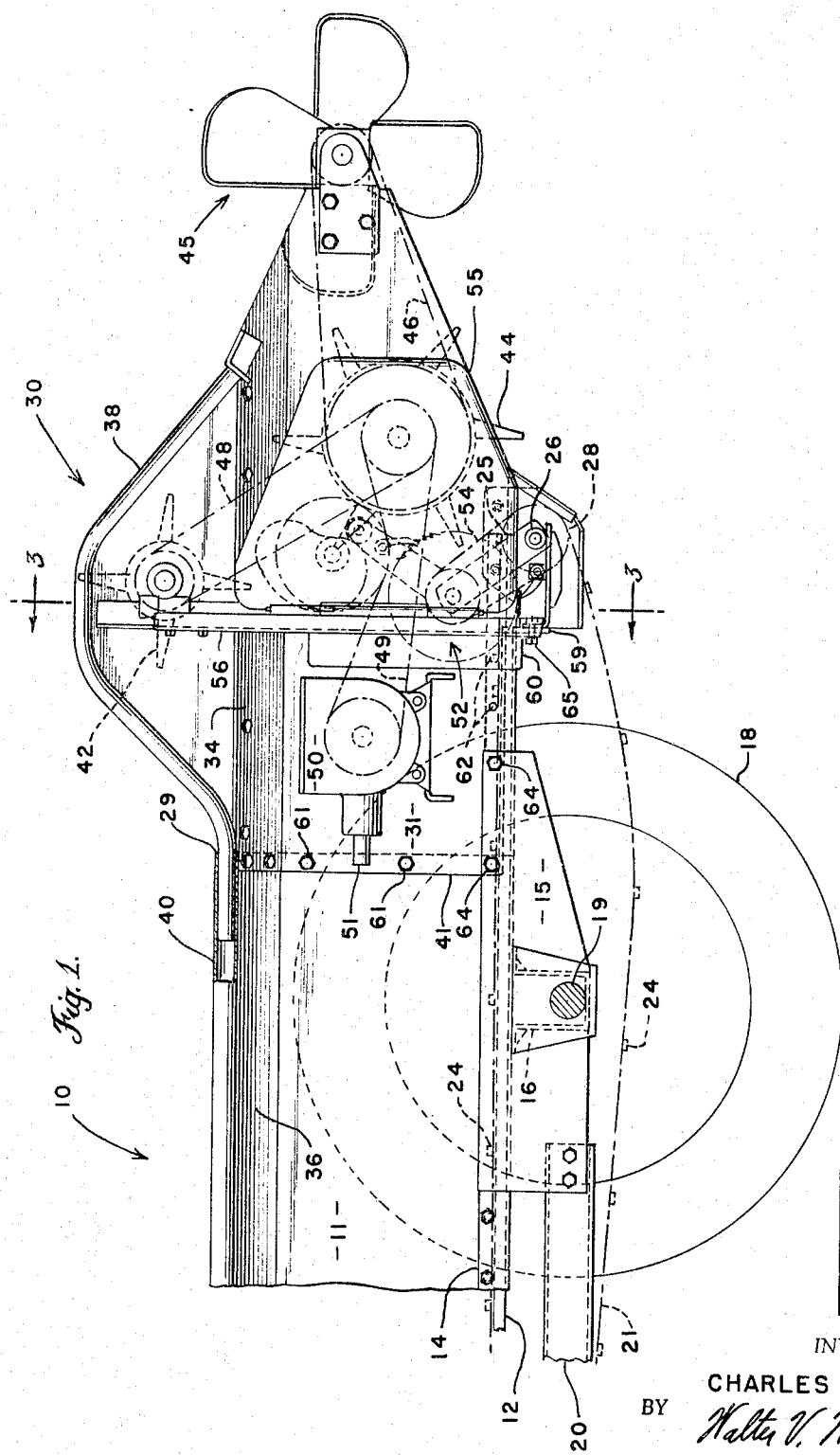

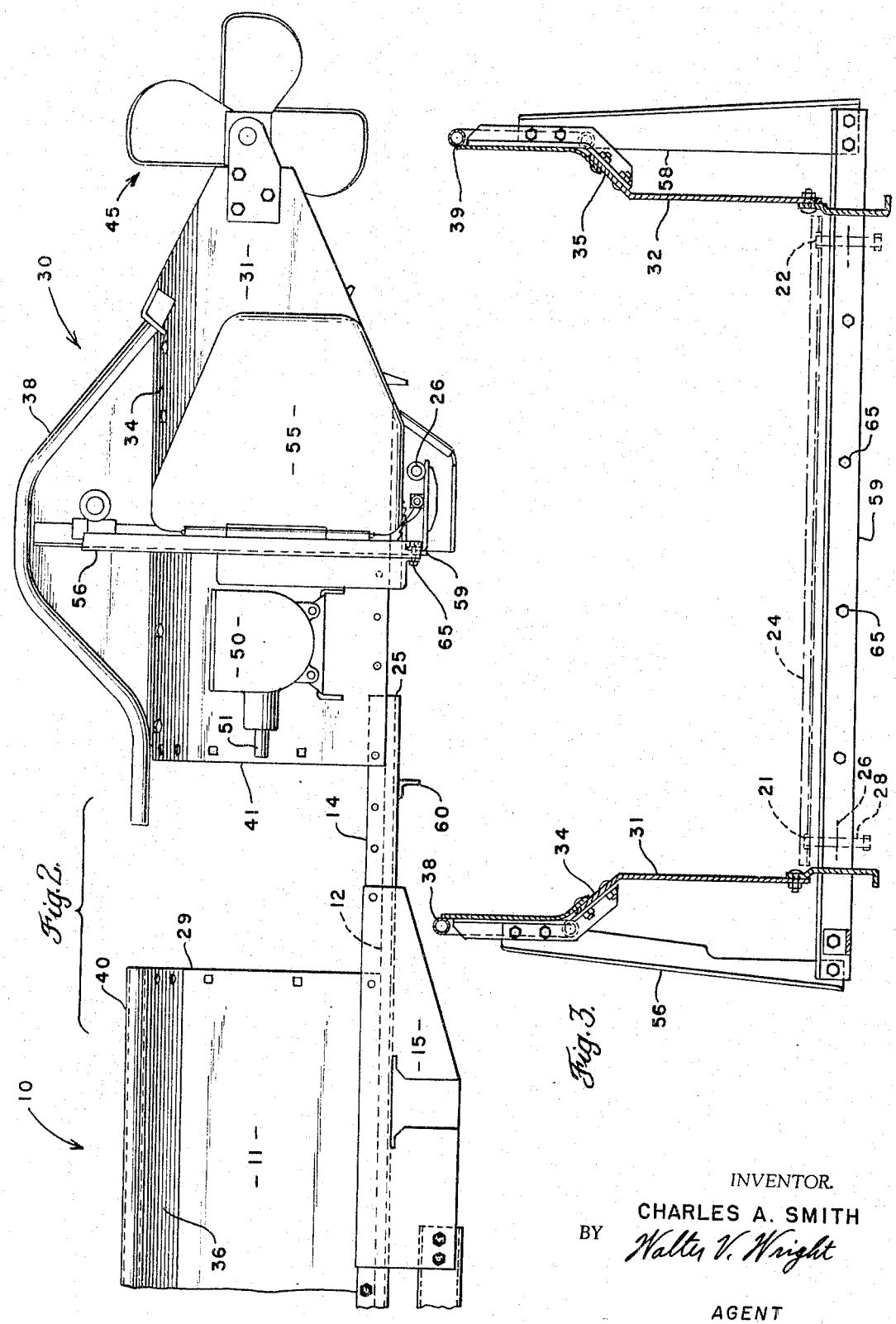

3,325,170
MANURE SPREADER CONSTRUCTION
Charles A. Smith, New Holland, Pa., assignor to Sperry Rand Corporation, New Holland, Pa., a corporation of Delaware
Filed Apr. 1, 1965, Ser. No. 444,652
6 Claims. (Cl. 275—6)

This invention relates generally to manure spreaders or the like. More specifically, it relates to a particular construction and integration of component sub-assemblies of a manure spreader or the like.

The basic parts of a common manure spreader are: a wagon-like box having an open back end, a conveyor to move the entire load rearwardly in the box to the open back end thereof, and mechanism at the back end to scatter the load behind the box. Present day manure spreaders, with capacities in the two hundred bushel range, are considerably larger than conventional spreaders of merely a few years ago. In order to reduce shipping space and cost, manufacturers commonly ship the spreaders to dealers in only a partially assembled condition. Assembly is completed by the dealer by bolting together the component parts, or sub-assemblies. Specifically, the scattering mechanism usually comprises a sub-assembly separate from the main load-carrying box. The scattering unit is bolted to the rear ends of the box side walls by the dealer. This joint between the scattering unit and the rear end of the load-carrying box is a common problem area in manure spreaders. In the first place, the joint is located at an area wherein the side walls have relatively low resistance to lateral flexing, namely at their free standing back ends. This is also in the immediate area of the drive mechanism for the floor conveyor and the scattering beaters. The floor conveyor is generally indexed rearwardly slowly in intermittent increments while the scattering beaters are driven in constant high speed rotation. The pulsating reaction force of the floor conveyor drive on the spreader body, resulting from the rearward indexing of the entire load, is of a high magnitude while the reaction forces of the beater drive mechanism are highly variable in accordance with the condition of the manure, its rate of presentation to the beaters and many other factors. The concentration of the operating forces in this area of low side wall rigidity along with the location of the scattering unit mounting joint in the same area, is the basic cause of many service problems. The scattering unit, itself, is quite heavy and its weight alone exerts considerable stress on the mounting joint and on the basically weak rear area of the spreader box.

Assembly of the spreaders by dealers is complicated by the fact that a portion of the drive mechanism is usually carried by the manure spreader box while the remainder of the drive mechanism is carried on the scattering unit. Thus, in assembly, the dealer must connect, test, and adjust various components of the drive mechanism to insure a proper operating relationship of the parts.

It is an object of this invention to integrate a separable manure scattering unit and a load-carrying manure spreader box in a manner to greatly increase the rigidity of the rear portion of the manure spreader, thereby reducing vibration and increasing the maintenance free service life of the spreader.

It is another object of this invention to simplify and speed up the assembly, by the dealer of a manure spreader having a separable scattering unit by eliminating his need to set up the scattering unit and bottom conveyor drive mechanism.

It is another object of this invention to provide a manure spreader having a separable scattering unit wherein the drive mechanism for both the scattering beaters and the spreader bottom conveyor is carried completely on the scattering unit, thereby enabling the drive mechanism to be completely assembled and "run in" by the manufacturer before shipping.

It is another object of this invention to provide a manure spreader having a separable scattering unit wherein the scattering unit is attached to the load-carrying box in a manner to distribute the reaction forces of the conveyor and the scattering unit drive mechanism over a considerable area of the spreader box thereby greatly reducing the stress concentration on the box.

It is another object of this invention to provide a manure spreader having a separable scattering unit wherein the scattering unit is attached to the load-carrying box along both vertical lines and fore-and-aft extending horizontal lines thereby providing a mounting joint rigid in at least two perpendicular planes.

It is another object of this invention to provide a manure spreader having a separable scattering unit wherein the scattering unit is attached to the load-carrying box along vertical lines and fore-and-aft and transverse horizontal lines as well as being anchored to the main chassis frame of the manure spreader in a manner to provide an extremely rugged, yet economical manure spreader construction.

These and other objects and advantages of this invention will be apparent upon reference to the following description and claims taken in conjunction with the accompanying drawings wherein:

FIG. 1 is a fragmentary side elevational view of a manure spreader constructed in accordance with the principles of the present invention;

FIG. 2 is a fragmentary exploded view similar to FIG. 1 showing the relationship of the separable scattering unit to the rear portion of a manure spreader load-carrying box; and FIG. 3 is a sectional view through the scattering unit taken on the line 3—3 of FIG. 1.

Referring now to the drawings in detail, the reference numeral 10 indicates, generally, the wagon-like, load-carrying box of a conventional style manure spreader. Box 10 has side walls 11, a bottom 12 and corner reinforcing angle frame members 14. Axle mounting plates 15 are disposed along the respective sides of box 10 at the bottom thereof. A transversely extending axle beam 16 is carried by plates 15 and supports box 10. Ground wheels 18 are journalled on spindles 19 carried by the axle beam. A draft frame 20 is connected to axle mounting plates 15 and extends forwardly under the box to be hitched to a tractor or other towing vehicle.

A conventional manure spreader floor conveyor comprising the usual chains 21 and 22 (see FIG. 3) and cross slats 24 is provided and moves rearwardly along the top surface of bottom 12 to the rear end 25 thereof (FIG. 2) and returns forwardly under the bottom of the spreader as may be seen in FIG. 1. Note that the rear terminal end 25 of bottom 12 substantially overlies the axis, or shaft, 26 of the conveyor driving sprocket 28 when the spreader is assembled as shown in FIG. 1. The spreader side walls 11 have rear terminal ends 29 spaced substantially forwardly of the rear terminal end 25 of spreader bottom 12.

The scattering unit, indicated generally by the reference numeral 30, has left and right side plate members 31 and 32, respectively. As may be seen in FIG. 3, the scattering unit side plates 31 and 32 have out-turned wing portions 34 and 35 which mate with similar wing portions 36 on the spreader side walls. This shape adds materially to the rigidity of the box side walls and the scattering unit side plates. Tubular reinforcing members 38 and 39 extend along the upper edges of the scattering unit side plates 31 and 32 and are received in tubes 40 formed on the upper edges of the side walls 11 of the spreader box.

It will be apparent from FIGS. 1 and 2 that the scattering unit side plates 31 and 32 extend both forwardly and rearwardly of the rear terminal end 25 of spreader bottom 12 when the scattering unit is mounted on the spreader box. The scattering unit side plates have forward ends 41 disposed at the rear terminal ends 29 of box side walls 11 in overlapping relation thereto to receive mounting bolts. In FIG. 1 conventional upper and lower scattering beaters 42 and 44 may be seen along with a conventional wide spreader beater 45. The beaters extend between the side plate members 31 and 32 of the scattering unit and are journalled thereon. The upper and lower beaters rotate clockwise as seen in FIG. 1 to tear material from the bulk mass of the load being moved rearwardly by the floor conveyor and discharge the material rearwardly to the wide spread beater unit 45 which is disposed at the extreme rear ends of the side plate members 31 and 32. Wide spread beater 45 scatters the material laterally and rearwardly from the box.

The wide spread beater 45 is driven by a chain-sprocket drive connection 46 from lower beater 44. Another sprocket-chain drive connection 48 drives upper beater 42 from lower beater 44. The drive to the lower beater 44 is by a chain-sprocket connection 49 from a gearbox 50 mounted on side plate 31 of the scattering unit ahead of the rear terminal end 25 of spreader bottom 12. A short input shaft 51 projects forwardly from gearbox 50. It is adapted to be connected by a conventional removable spline shaft connector or the like to a power-take-off extension shaft (not shown) which extends rearwardly along the side of the spreader box from the power-take-off means of the towing vehicle. The same chain drive 49 which drives lower beater 44 also drives a pawl and ratchet indexing mechanism 52 which, in turn, drives the floor conveyor drive sprocket 28 by a chain 54. The indexing mechanism and many of the driving sprockets are enclosed by a protective shield 55 best seen in FIG. 2. It may also be seen in FIG. 2, wherein the axis, or shaft, 26 of conveyor drive sprocket 28 is visible, that the conveyor drive sprocket is journalled on the scattering unit along with all the other driving and driven members of the drive mechanism. The specific drive mechanism for the various beaters and the conveyor is not considered to be a part of the present invention other than the fact that the entire drive assembly for the spreader is provided completely on the scattering unit. Other specifically different drives could be employed. The key factor here is that the extension of scattering unit sides 31 and 32 forwardly of the rear end of the box bottom provides space for the entire drive on the scattering unit. Removal of the scattering unit from the spreader box results in removal of the entire drive mechanism with all driving connections intact.

In addition to the out-turned wings 34 and 35 and the heavy gauge side plate members 31 and 32, the rigidity of the scattering unit is supplemented by a brace structure (FIG. 3) consisting of vertical left and right side brace members 56 and 58 extending beside, and anchored to, side plates 31 and 32. A horizontal brace and mounting bracket 59 interconnects the lower ends of brackets 56 and 58 and extends transversely therebetween below the level of the spreader box bottom 12. When the scattering unit is moved forwardly relative to the box into position for attachment thereto, the horizontal brace 59 is moved into abutting relation with a transverse box frame member 60 (FIG. 2) extending across the underside of the box bottom.

It will be apparent from FIGS. 1 and 2 that the vertical joint wherein scattering unit side plate members 31 and 32 are attached by bolts 61 to the spreader box side walls 11 is located substantially forwardly of the rear terminal end 25 of bottom 12. A series of bolts 62 attach the scattering unit side plates 31 and 32 to the frame angle 14 of the box along fore-and-aft extending horizontal lines between the rear end 25 of the box bottom 12 and the rear terminal ends 29 of side walls 11. These two perpendicularly extending connection lines supplement each other to greatly increase the rigidity of the jointure between the scattering unit and the box in opposition to both vertical and lateral flexing. It will also be seen in FIG. 1 that the terminal ends 29 of side walls 11 overlie the axle mounting plates 15. This location of the vertical joint between the box side walls and the scattering unit side plates enables the scattering unit to be tied directly to the plate 15 of the rigid axle mounting structure by bolts 64 seen in FIG. 1. Attachment of the horizontal transverse brace member 59 to the box frame member 60 by series of bolts 65 on the underside of the box bottom 12 completes the jointure between the scattering unit and the manure spreader box.

The above manner of integrating the scattering unit and box of a conventional type of manure spreader effects a manyfold increase in the rigidity of maintenance free service life of the rear portion of the implement by distributing the forces acting between the component parts of the spreader over a large area of the implement, including the axle structure, and opposing these forces by joints running perpendicular thereto. These results are accomplished without adding materially to the cost or weight of the implement, as opposed to the conventional practice of using heavier more costly materials or adding a complex of braces at this area of the spreader. The extension of the scattering unit forwardly of the rear terminal end of the bottom also provides sufficient space to enable the entire drive mechanism including the gearbox to be carried by the scattering unit; thereby providing better distribution of the reaction forces of the various drives as well as simplifying dealer assembly of the spreader and insuring proper factory testing and adjustment of the complete drive mechanism.

The above construction facilitates the interchangeable mounting of various well-known types of scattering units, such as single or double beater units in place of the triple beater scattering unit shown, on a single load-carrying box; since each scattering unit contains a complete operatively connected drive mechanism. This greatly reduces the inventory and stock space required by a dealer to stock a variety of different models, or types, of spreaders.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A manure spreader comprising a load-carrying box having a frame, side walls and a fixed bottom, wheels mounted on said frame and supporting said box for travel over the ground in a forward direction, said bottom having a rear terminal end, conveyor means operable along said bottom to convey material in said box rearwardly to said rear terminal end of said bottom, a scattering unit disposed at the rear of said box, said scatering unit having sides and manure scattering means extending transversely between said sides, said scattering unit sides extending forwardly along said bottom beyond said rear terminal end of said bottom, means fixedly attaching said scattering unit sides, respectively, to said box side walls forwardly of said rear terminal end of said bottom, and means fixedly attaching said scattering unit sides to said box along fore-and-aft lines between said rear terminal end of said bottom and the forwardmost ends of said scattering unit sides.

2. A manure spreader comprising a load-carrying box having a frame, side walls and a fixed bottom, wheels mounted on said frame and supporting said box for travel over the ground in a forward direction, said bottom having a rear terminal end, conveyor means operable along said bottom to convey material in said box rearwardly to said rear terminal end of said bottom, said side walls having rear terminal ends spaced substantially forwardly of said bottom rear terminal end, a scattering unit disposed at the rear of said load-carrying box, said scattering unit having sides and manure scattering means extending transversely between said sides, said scattering unit sides extending along and adjacent said bottom substantially forwardly beyond said rear terminal end of said bottom to said rear terminal ends of said side walls, means fixedly attaching said scattering unit sides respectively to said rear terminal ends of said side walls, and means fixedly attaching said scattering unit sides to said box along fore-and-aft lines extending between said rear terminal end of said bottom and said rear terminal ends of said side walls.

3. A manure spreader comprising a load-carrying box having a frame, side walls and a bottom, wheels mounted on said frame and supporting said box for travel over the ground in a forward direction, said bottom having a rear terminal end, conveyor means operable along said bottom to convey material in said box rearwardly to said rear terminal end of said bottom, said side walls having rear terminal ends respectively spaced pre-determined distances forwardly of said bottom rear terminal end, a scattering unit disposed at the rear of said load-carrying box, said scattering unit having sides and manure scattering means extending transversely between said sides, said scattering unit sides extending both forwardly and rearwardly beyond said rear terminal end of said bottom and having forward ends respectively disposed said predetermined distances forwardly of said bottom rear terminal end, at least a portion of said manure scattering means extending between said scattering unit sides rearwardly of said bottom rear terminal end, means fixedly attaching said scattering unit sides respectively to said rear terminal ends of said box side walls, and means fixedly attaching said scattering unit sides directly to said frame forwardly of said rear terminal end of said bottom.

4. A manure spreader comprising a load-carrying box having a frame, side walls and a bottom, wheels mounted on said frame and supporting said box for travel over the ground in a forward direction, said bottom having a rear terminal end, an endless conveyor operable along said bottom to convey material in said box rearwardly to said rear terminal end of said bottom, said side walls having rear terminal ends respectively spaced forwardly of said bottom rear terminal end, a scattering unit disposed at the rear of said load-carrying box, said scattering unit having sides and a manure scattering beater journalled on and extending between said sides for rotation about a generally horizontal transverse axis, said scattering unit side extending both forwardly and rearwardly beyond said rear terminal end of said box bottom, said beater axis being disposed rearwardly of said bottom rear terminal end, means fixedly attaching said scattering unit sides respectively to said side walls and directly to said frame forwardly of said rear terminal end of said box bottom, a gearbox carried by said one of said scattering unit sides, a drive sprocket for said endless conveyor journalled on one of said scattering unit sides adjacent said bottom rear terminal end, and means drivingly connecting said gearbox to said sprocket and said rotatable beater whereby the driving connection between said gearbox and said beater and sprocket is contained solely on said scattering unit and is unaffected by removal or attachment of said scattering unit to said box.

5. A manure spreader comprising a load-carrying box having a frame, vertical side walls and a horizontal bottom, wheels mounted on said frame and supporting said box for travel over the ground in a forward direction, said bottom having a rear terminal end, an endless conveyor operable along said bottom to convey material in said box rearwardly to said rear terminal end of said bottom, said side walls having rear terminal ends respectively spaced forwardly of said bottom rear terminal end, a scattering unit disposed at the rear of said load-carrying box, said scattering unit having left and right side plate members, said side plate members having forward ends disposed respectively at said rear terminal ends of said box side walls forwardly of said rear terminal end of said bottom and rear ends disposed rearwardly of said rear terminal end of said bottom, a brace structure having vertical brace members connected to and extending along the respective scattering unit side plate members substantially mid-way between the ends thereof and a horizontal brace member extending transversely between said vertical brace members below the level of said box bottom, a manure scattering beater journalled on and extending transversely between said side plate members at the rearmost ends thereof, means fixedly attaching the forward ends of said scattering unit side plate members respectively to said rear terminal ends of said box side walls, means fixedly attaching said scattering unit side plate members directly to said frame along fore-and-aft lines between said rear terminal end of said bottom and said forward ends of said scattering unit side plate members, and means connecting said horizontal brace member to the underside of said box bottom.

6. A manure spreader as recited in claim 5 wherein said frame includes axle mounting plates disposed along the respective side walls of said box, an axle carried by said axle mounting plates, said wheels being journalled on said axle, said box side wall rear terminal ends being disposed above said axle mounting plates, said bottom rear terminal end being disposed rearwardly of said axle mounting plates, the forward ends of said scattering unit side plate members being bolted respectively to said axle mounting plates.

References Cited

UNITED STATES PATENTS

| | | | |
|---|---|---|---|
| 2,410,953 | 11/1946 | Messenger et al. | 275—5 |
| 2,621,934 | 12/1952 | Atkinson | 275—6 |
| 2,653,028 | 9/1953 | Templeton | 275—3 |
| 2,699,337 | 1/1955 | Best | 275—5 |
| 2,894,756 | 7/1959 | McDonough | 275—6 |

ABRAHAM G. STONE, *Primary Examiner.*

J. R. OAKS, *Assistant Examiner.*